United States Patent [19]

Regnier et al.

[11] Patent Number: 4,560,704

[45] Date of Patent: Dec. 24, 1985

[54] POLYAMINE BASED BONDED PHASE CHROMATOGRAPHY

[75] Inventors: Frederick E. Regnier, West Lafayette, Ind.; Shri P. Gupta, Ann Arbor, Mich.

[73] Assignee: Purdue Research Foundation, West Lafayette, Ind.

[21] Appl. No.: 441,057

[22] Filed: Nov. 12, 1982

[51] Int. Cl.[4] ........................ C08D 5/20; C08F 30/08; C08G 77/04

[52] U.S. Cl. ..................................... 521/31; 525/101; 521/25; 528/10; 528/28

[58] Field of Search ..................... 521/28, 25; 210/679; 525/101; 528/28

[56] References Cited

U.S. PATENT DOCUMENTS

| | | | |
|---|---|---|---|
| 2,728,743 | 12/1955 | Warrick | 528/28 |
| 3,886,080 | 5/1975 | Schucker et al. | 521/25 |
| 3,969,261 | 7/1976 | Meiller | 521/28 |
| 3,983,299 | 9/1976 | Regnier | 428/405 |
| 3,998,985 | 12/1976 | Kitaj | 525/101 |
| 4,291,154 | 9/1981 | Blount | 528/28 |
| 4,415,631 | 11/1983 | Schutijser | 216/656 |

FOREIGN PATENT DOCUMENTS 1456865 12/1976 United Kingdom ................. 54/25

*Primary Examiner*—Joseph L. Schofer
*Assistant Examiner*—Peter F. Kulkosky
*Attorney, Agent, or Firm*—O'Rourke & Harris

[57] ABSTRACT

Bonded phase chromatography is disclosed wherein an organosilane reacts with a polyamine to form a support matrix which is attached to the inorganic surface of a support structure. In forming an organic polyamine support matrix, a neutral organosilane is bonded to the inorganic surface with the organosilane having a functional group sufficiently reactive so that an organic amine polymer reacts with the functional group to cause covalent bonding of the organic amine polymer to the inorganic surface. By addition of an organic stationary phase group, the organic polyamine support matrix is formed into any predetermined one of a plurality of types of chromatography supports.

33 Claims, 5 Drawing Figures

POLYAMINE BASED BONDED PHASE CHROMATOGRAPHY

FIELD OF THE INVENTION

This invention relates to bonded phase chromatography and, more particularly, relates to polyamine based bonded phase chromatography.

BACKGROUND OF THE INVENTION

Organosilanes have been heretofore used to couple various organic moieties to the surface of inorganic materials. Initially, this coupling was achieved with simple organosilane monomers so that the organosilane was reacted with an inorganic material with the monomer being attached to the inorganic surface through varying numbers of Si—O—Si bonds. The organic portion of organosilane monomers coupled in this manner imparts organic character to the inorganic material and is the basis for the preparation of bonded phase liquid chromatography supports.

Such supports, however, were not completely acceptable since the bonding reaction proved to be slightly reversible. During the elution of columns with thousands of volumes of mobile-phase, soluble organosilane monomers were eluted from the column, and, as the stationary phase eroded from the surface, the chromatographic properties of the column changed.

In addition, it was observed that when the organosilane γ-aminopropyl/triethoxysilane was utilized, a relatively poor surface coverage was obtained during the organosilane bonding reaction and a relatively active surface that denatured proteins was left. This problem in attaching primary amine organosilanes was thought to arise from the formation of ion pairs between amines and surface silanoles. When surface silanoles were sequestered in this manner, they were not available for silaxane bond formation. Later when the support was used in chromatographic separations, these ion pairs dissociated and generated an active surface. The problems of organosilanes leakage from the surface and the presence of residual silanoles made it desirable to pursue alternative bonding chemistry.

A coupling technique refinement was later developed consisting of the attachment of carbohydrate polymers to the surface of porous inorganic supports through functional groups on the organosilanes (see, for example, U.S. Pat. Nos. 3,982,299 and 4,029,583). Preformed polysaccharide polymers were attached to the inorganic supports at many sites during the bonding reaction and subsequently stationary-phase groups attached to these immobilized organic polymers.

Due to multiple site attachment, the polymeric support materials overcame the problem of bonded-phase leakage from the surface, but some problems still remain, at least in some instances and/or usages. For example, where the carbohydrate polymer bonded phases have γ-aminopropyltriethoxysilane as the organosilane anchoring group, these supports retained some of the non-specific adsorption noted above.

An alternative approach for attaching polymers to inorganic supports was also developed and is described, for example, in U.S. Pat. Nos. 4,029,583 and 3,808,125, wherein the organic support has first coupled thereto an organosilane monomer containing a functional group capable of being incorporated into a polymeric matrix during a polymerization reaction. When these supports were then coated with a second monomer and the coated layer polymerized into a three dimensional matrix, the functional group of the organosilane was incorporated into the matrix and the polymer layer bonded to the surface at many sites. Stationary phase groups for chromatography were then attached to this polymer matrix either during the course of polymerization or after polymerization had been completed.

While these polymerization reactions for preparing supports proved to be capable of overcoming the problem of inadequate binding of surface silanoles because neutral silanes were used in the initial coating reaction, the coating reactions proved to be difficult to reproduce in the preparation of five and ten micron particle diameter supports.

Another procedure for the preparation of a bonded-phase chromatography support has also been developed. In this procedure, preformed organic polymers were absorbed to the surface of the inorganic support and the adsorbed layer was then cross-linked to form a pellicle, or skin, on the surface (see, for example, U.S. Pat. No. 4,245,005). In this procedure, there is no covalent bonding between the organic polymer and the inorganic surface, the cross-linked polymer layer is simply held in place by adsorption. This procedure, while being highly reproducible and completely blocking surface silanoles, is usable only for preparing anion exchange supports.

Thus, none of the supports and/or processes for forming such supports have proved to be completely acceptable and have, for example, either lacked stability, quality in the support obtained, or versatility in the synthetic forming procedure.

SUMMARY OF THE INVENTION

This invention provides improved bonded phase chromatography including an improved process for forming the support and an improved support formed by the process. An organic polyamine support matrix is formed by bonding a neutral organosilane to an inorganic surface with the organosilane having a functional group sufficiently reactive so that an organic amine polymer reacts with the functional group to cause covalent bonding of the organic amine polymer to the inorganic surface, and with the addition of an organic stationary phase group, the support is formed into a predetermined type of chromatographic support.

It is therefore an object of this invention to provide an improved process for preparing a bonded phase support.

It is another object of this invention to provide an improved process for preparing a bonded phase support for a chromatographic system.

It is another object of this invention to provide an improved process for preparing a bonded phase support having excellent dimensional stability and superior separation properties.

It is still another object of this invention to provide an improved process for preparing a bonded phase support for a high speed chromatographic system that provides quality of performance.

It is still another object of this invention to provide an improved process for preparing a bonded phase support utilizing an organosilane and a polyamine.

It is yet another object of this invention to provide an improved process for preparing a bonded phase chromatographic support wherein an organosilane reacts with a polyamine to form an organic polyamine support matrix.

It is still another object of this invention to provide an improved process for preparing a bonded phase chromatographic support wherein a neutral organosilane is bonded to an inorganic surface of a support structure and a polyamine is covalently bonded to the inorganic surface having said neutral organosilane bonded thereto.

It is still another object of this invention to provide an improved process for preparing a bonded phase chromatographic support wherein a neutral organosilane is bonded to the inorganic surface with the organosilane having a functional group sufficiently reactive so that an organic amine polymer reacts with the functional group to cause covalent bonding of the organic amine polymer to the inorganic surface.

It is still another object of this invention to provide a process for preparing a bonded phase support wherein a single synthetic route is utilized to prepare a variety of supports for different chromatographic modes.

It is still another object of this invention to provide an improved bonded phase chromatographic support.

It is still another object of this invention to provide an improved bonded phase chromatographic support for a high speed chromatographic system that provides quality of performance.

It is still another object of this invention to provide an improved bonded phase chromatographic support having excellent dimensional stability and superior separation properties.

It is still another object of this invention to provide an improved bonded phase chromatographic support made by the process described herein.

With these and other objects in view, which will become apparent to one skilled in the art as the description proceeds, this invention resides in a novel construction, combination, arrangement of parts, composition and method substantially as hereinafter described, and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings, together with the written specification, illustrate a complete embodiment of the invention according to the best mode so far devised for the practical application of the principles thereof, and in which.

DESCRIPTION OF THE INVENTION

In this invention, bonded phase coatings for inorganic supports are prepared to enable such supports to be used in the selective partitioning of molecules ranging in molecular size from about 16 to $10^7$ daltons. The supports are prepared using, basically, three steps—bonding a neutral organosilane to the inorganic surface of the support structure, attaching a polyamine to the inorganic surface having the neutral organosilane bonded thereto to form a support matrix, and attaching a ligand to the support matrix.

The inorganic material utilized may be conventional materials utilized in known chromatographic supports and may be varied in size and structure as is known in such supports, with the prepared materials ranging from about 100 to 1000 Å pore diameter and about 3 to 100 micrometers in particle size for use in high performance liquid chromatography columns.

The neutral organosilane is preferably bonded to the inorganic surface to form a thin neutral organic layer, after which a thin layer of polyamine is preferably covalently cross-linked to the inorganic surface having the neutral organosilane bonded thereto, and then ligands are preferably covalently cross-linked to the surface of the polyamine bonded silicon to form the chromatographic support.

The objective of the first reaction is to bond a neutral organosilane monomer to the surface of the inorganic support in such a way so as to eliminate the maximum number of surface silanoles. In addition to being neutral, this bonded organosilane preferably contains a functional group that is sufficiently reactive for preformed organic amine polymers to react in the second reaction and be covalently bonded to the surface along with the polyamine. These two steps provide a support matrix that can then be then utilized to prepare a number of different types of chromatographic supports.

Organic functional groups used in these reactions were esters, isocyanates and epoxides which react with a polyamine to cause bonding to the surface at many sites and results in preventing the erosion of individual organosilane monomers from the surface as the column ages. It was found that di- and mono-chlorosilanes were superior to tri-chlorosilanes in most cases with some inorganic materials being more difficult than others to coat. Organic polyamines ranging in size from about 200 to 60,000 daltons were used. The second reaction provides a stable organic matrix which can then be converted into a large number of different types of chromatographic support materials in a single step (i.e., the polyamine matrix gives maximum versatility). In some cases, a low molecular weight amine was superior while in others the reverse was found to be true. In addition, it was found that the more hydrophilic polyamines are superior to the more hydrophobic commercial polyamines.

The third reaction couples the organic stationary phase group to the surface of the central pellicular support matrix. By this relatively simple three-step bonding scheme, size exclusion, anion exchange, cation exchange, reversed phase, chelation and affinity chromatography supports have been realized. In the third reaction, there were also considerable differences between supports. For example, when the polyamine was crossed-linked with the more hydrophilic multifunctional oxirane cross-linkers, resolution was substantially increased. Also, diglycolic anhydride produced a cation exchange support of greater utility than one reacted with cyclopentane tetracarboxylic dianhydride.

In the preparation of a bonded-phase support material for the separation of proteins, it is generally found that a particular combination of inorganic support and organic bonding chemistry provides the optimum material for this purpose. In other words, a particular marriage between the most appropriate components in all of the supports is the essential ingredient in producing the most optimum support material. The scientific basis for the selection of optimum components is not known at the present time, and the optimization process must therefore depend, in large part, on trial and error.

It has previously been shown in the case of the synthesis of affinity chromatography supports on controlled porosity glass matricies that γ-aminopropyl sylilated surfaces may be further derivatized to produce inorganic supports having most of the common chromatographic phases.

However, such bonded phases did not prove to be completely stable. It has also been shown that good stability was provided when using a cross-linked polyamine support. This invention makes use of the synthetic utility and stability separately found in known supports to produce an improved support with both features.

As brought out hereinabove, three basic steps are utilized. In the first step, one of several neutral organosilanes was bonded to the surface as shown in reaction diagrams as follows:

-continued
REACTION DIAGRAMS port. The reactivity of the methylester, isocyanate, and epoxy functional groups in these organosilanes with polyamines are exploited as shown for an anion exchange support in Table 1 as follows:

TABLE 1
ANION EXCHANGE $$\text{B.P. (I, II, III)-R}_3 \xrightarrow[\text{Dioxan}]{R_7} \text{B.P. (I, II, III)-(R}_3\text{)—R}_8$$

| $R_7$ | $R_8$ |
|---|---|
| 1. Butane Monoepoxide | 1. $-CH_2\overset{\overset{\displaystyle CH}{\vert}}{C}HCHCH_2CH_3$ |
| 2. Butane Diepoxide | 2. $-CH_2\overset{\overset{\displaystyle OH}{\vert}}{C}H\overset{\overset{\displaystyle OH}{\vert}}{C}HCH_2$ |
| 3. Butane Diol Diglycidylether | 3. $(-CH_2\overset{\overset{\displaystyle OH}{\vert}}{C}HCH_2OCH_2CH_2)_2$ |
| 4. Epon 812 | 4. $(CH_2\overset{\overset{\displaystyle OH}{\vert}}{C}HCH_2OCH_2)_2CHOCH_2\overset{\overset{\displaystyle OH}{\vert}}{C}HCH_2$ |
| 5. Epon 828 | 5. $CH_2\overset{\overset{\displaystyle OH}{\vert}}{C}HCH_2OC_6H_5\overset{\overset{\displaystyle CH_3}{\vert}}{C}$<br>$\qquad\qquad\qquad CH_3{}^2$ |
| 6. 1,2-Epoxy-Ethoxy Propane | 6. $-CH_2\overset{\overset{\displaystyle OH}{\vert}}{C}HCH_2OCH_2CH_3$ |
| 7. 1,2-Epoxy-3-Pentoxy Propane | 7. $-CH_2\overset{\overset{\displaystyle OH}{\vert}}{C}HCH_2O(CH_2)_4CH_3$ |
| 8. 1,2-Epoxy-3-Propoxy Propane | 8. $-CH_2\overset{\overset{\displaystyle OH}{\vert}}{C}HCH_2OCH_2CH_2CH_3$ |
| 9. 1,2-Epoxy-3-Hexoxy Propane | 9. $-CH_2\overset{\overset{\displaystyle OH}{\vert}}{C}HCH_2O(CH_2)_5CH_3$ |
| 10. Ethane Diol Diglycidyl Ether | 10. $(-CH_2\overset{\overset{\displaystyle OH}{\vert}}{C}HCH_2)CH_2)_2$ |
| 11. Ethylene Oxide | 11. $-CH_2\overset{\overset{\displaystyle OH}{\vert}}{C}H-$ |
| 12. Glycidol | 12. $-CH_2\overset{\overset{\displaystyle OH}{\vert}}{C}HCH_2OH$ |
| 13. Propylene Oxide | 13. $-CH_2\overset{\overset{\displaystyle OH}{\vert}}{C}HCH_3$ |

B.P. (BONDED PHASE TYPE III)

The function of the organosilane is to both eliminate the maximum number of surface silanoles and serve as an anchoring arm for attaching polyamines to the support. Although not indicated in the reactions, polyamines have many amine functional groups that are bonded to the surface at many sites. Bonding of polymers to the surface at multiple sites prevents erosion of both the polymer and silanol monomers from the column during operation. Organic polyamines ranging in size from about 200 to 60,000 daltons have been used with sufficient amine functional groups remaining after bonding for the attachment of additional organic moieties as shown in the reaction diagrams as set forth herein above.

Anion exchange supports are prepared by derivatizing the polyamine with any of a series of oxiranes.

When the matrix is derivatized with multifunctional oxiranes there is a strong possibility of further cross-linking occurring at the surface.

Cation exchange supports have been prepared by treating the polyamine support either with a cyclic anhydride or 1,3-propane sultone. Both primary and secondary amines in the polyamine react to give amides. During the course of amide bond formation, the anhydrides also generate a carboxyl group. The function of this reaction is to eliminate the cationic properties of the support matrix and introduce the anionic character necessary for cation exchange chromatography. By selecting symmetrical anhydrides of differing alpha and/or beta substitution, the pK of the ion exchanger can be changed. Hydrophobicity of the matrix is varied by the introduction of aromatic or aliphatic residues into the anhydride. The N-acetylhomocystine thiolactone, on the other hand, produces a sulfhydryl group when reacted with polyamines. The sulfhydryl group may be used directly as a chromatographic stationary phase for mercuric protein separation.

Acid anhydrides may also be used to create a neutral matrix of controlled hydrophilicity. When the polyamine is acetylated with an acetic anhydride a coating suitable for aqueous size exclusion chromatography is generated. Acylation with higher homologs such as propionic and butyric anhydride produce matricies of increasing hydrophobicity. It is anticipated that these slightly hydrophobic materials should be useful in reversed-phased chromatography of proteins.

Although the polyamine supports themselves are chelating matricies, a strong chelator may be generated by derivatizing the polyamine with pyridine-2 carboxyaldehyde or iodoacetic acid.

The functional groups generated on the inorganic surface, as shown in the reaction diagrams, are sufficient for the preparation of any of a variety of bioaffinity matricies.

Anion exchange supports were prepared by derivatizing the covalently bonded PEI matrix with a multifunctional oxirane as shown in Table 1 as set forth herein above.

Treatment with monofunctional oxiranes resulted in the derivatization of all primary and secondary amines along the polyamine chain to form a tertiary amine support. On the other hand, the use of multifunctional oxiranes resulted in both the derivatization of primary and secondary amines along with the cross-linking of polyamine chains. This difference can potentially result in changes in resolution because of an alteration in the topography of surfaces.

Figure 1:
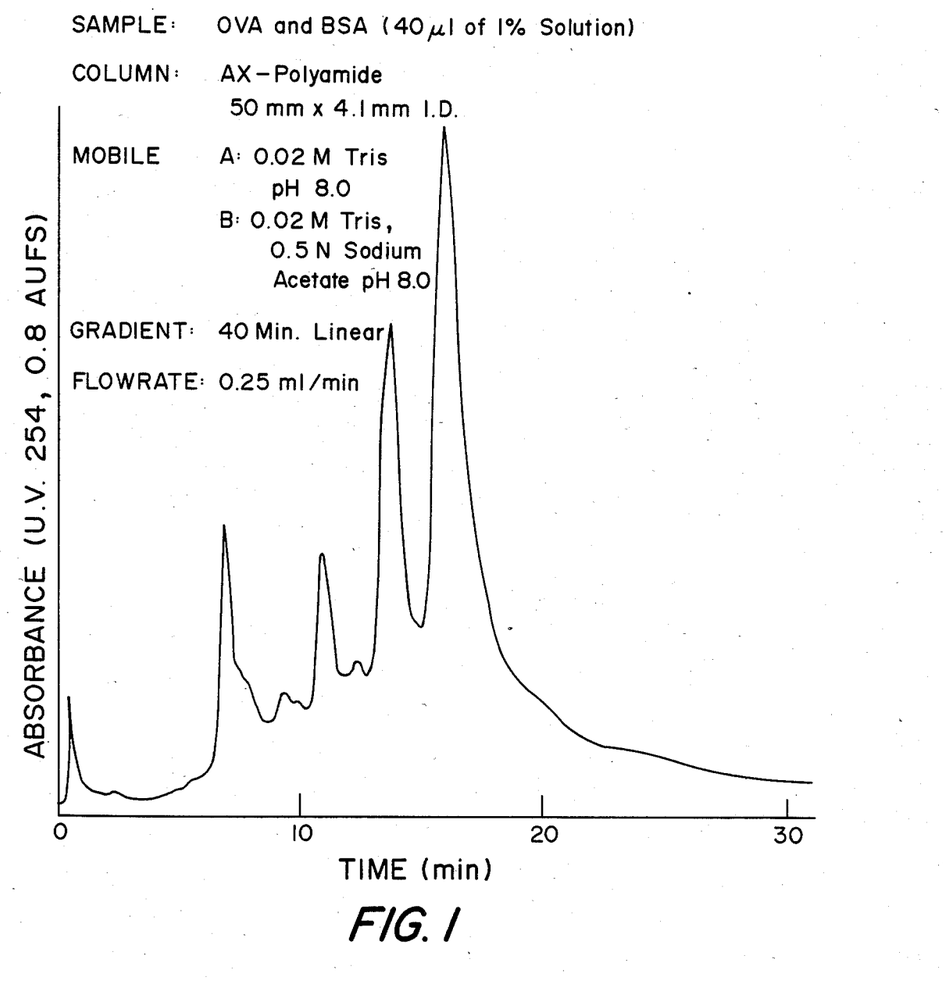
FIG. 1 is an elution curve for an anion exchange-polyamide column.

Resolution of a protein mixture on the butanedioldiglycidylether ether support is shown in FIG. 1. Butane Diol-diglycidyl ether is found to be a borderline cross-linker between hydrophilic and hydrophobic phases. This mixture was earlier analyzed on an absorbed PEI support and the resolution in FIG. 1 is equivalent to that earlier observed.

In addition to having resolution comparable to the absorbed PEI, the protein ion exchange capacity is shown in Table 1 to be equivalent to that of the absorbed PEI coatings. It may be concluded that the difference in the way the PEI is attached to the surface has minimal influence on the resolving power of the resulting supports.

TABLE 2

| SUPPORTS | % $E_o$ | % $E_i$ | % $E_s$ | % $E_{pv}$ | % $E_{sv}$ |
|---|---|---|---|---|---|
| Lichrosorb 10μ; 100A° Pore Diameter 2-Carbethoxyethyltri-Chlorosilane + PEI$_6$ + Acetic Anhydride | 47 | 21 | 32 | 40 | 60 |
| Lichrosorb 10μ; 100A° Pore Diameter 2-Carbethoxyethyl-Trichlorosilane + TEPA + Acetic Anhydride | 45 | 30 | 24 | 56 | 44 |
| Lichrosphere 10μ; 100A° Pore Diameter 2-Carbethoxyethyl-Trichlorosilane + PEI$_6$ Acetic Anhydride | 39 | 32 | 29 | 53 | 47 |
| Lichrosphere 10μ; 2 Carbethoxyethyl Trichlorosilane + TEPA + Acetic Anhydride | 36 | 36 | 27 | 57 | 43 |
| Vydac 10μ; 300A° Pore Diameter + 2 Carbethoxyethyl Trichlorosilane + PEI$_6$ + Acetic Anhydride | 38 | 30 | 32 | 49 | 51 |

For size exclusion chromatography, although the PEI 300 coating was the most favorable in terms of minimum consumption of pore volume, it was the least favorable in terms of hydrophobicity. When the acetylated polyamine coatings were tested for hydrophobicity, retention increased with increasing ionic strength of the mobile phase. It is already known that acetamide derivatives are quite hydrophilic in SEC columns. The hydrophobicity of the polyamine acetate coating is probably not due to the acetamide derivative itself. It is suggested that the polyamine acetate coating is covering a hydrophobic surface.

Figure 2:
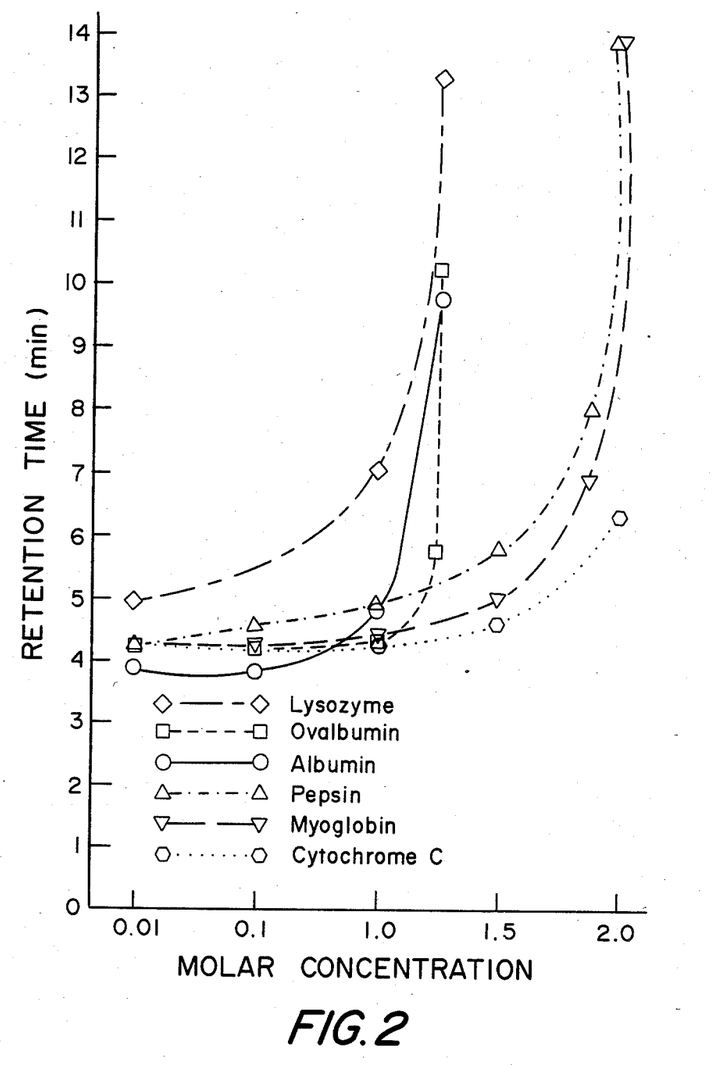
FIG. 2 is a graph illustrating retention time v mobile phase salt concentration for a plurality of proteins.
Figure 3:
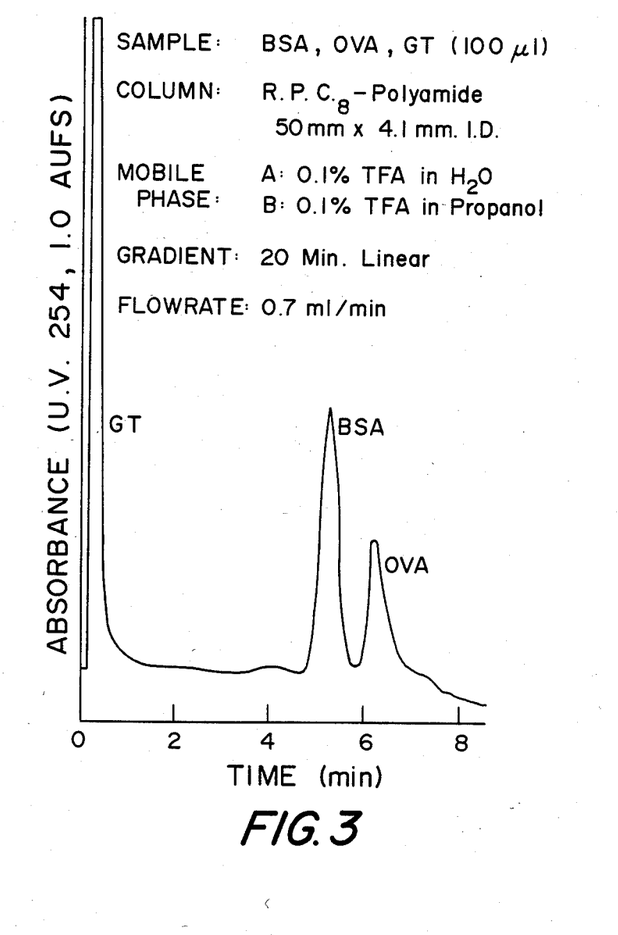
FIG. 3 is an elution curve for a $C_8$ reversed phase-polyamide column.

Polyethyleneamine contains approximately 33 percent tertiary amine groups. It is apparent from the bonding chemistry and derivatization procedures outlined above that these tertiary amine groups would still exist at the completion of these reactions. It was therefore expected that the polyethyleneamine acetates would behave as weak ion exchange columns. When these supports were subjected to tests for residual surface charge, it was found that they behave as neutral materials. It has been indicated in literature that this is to be expected since the branching of heteroatom density around the tertiary amine groups in PEI preventing them from behaving as weak ion exchangers. Even with the protein pepsin (pI=2.0) the polyamine acetate supports exhibited no ion exchange activity. The size exclusion calibration curve for one of these polyamine acetate columns is shown in FIG. 2. This size exclusion column showed good longevity and resolved a series of proteins.

Hydrophobic supports were prepared by treating polyamine bonded silica with the esters on anhydrides of higher carbon chain length as shown in Tables 3 and 4 as follows:

TABLE 3

SIZE EXCLUSION AND HYDROPHOBIC (REVERSED PHASE)

$$\text{B.P. (I, II, III)-R}_3 \xrightarrow[\text{Dioxan; Pyridine}]{R_g} \text{B.P. (I, II, III)-(R}_3\text{)}-R_{10}$$

TABLE 3-continued
SIZE EXCLUSION AND HYDROPHOBIC (REVERSED PHASE)

| $R_9$ | $R_{10}$ |
|---|---|
| 1. Acetic Anhydride | 1. $-\overset{\overset{O}{\|}}{C}-CH_3$ |
| 2. Benzoic Anhydride | 2. $-\overset{\overset{O}{\|}}{C}-C_6H_5$ |
| 3. Hexanoic Anhydride | 3. $-\overset{\overset{O}{\|}}{C}-CH_2CH_2CH_2CH_2CH_3$ |
| 4. Propionic Anhydride | 4. $-\overset{\overset{O}{\|}}{C}-CH_2CH_3$ |
| 5. Trifluoroacetic Anhydride | 5. $-\overset{\overset{O}{\|}}{C}-CF_3$ |
| 6. Methyl Isocyanate | 6. $=C=N-CH_3$ |
| 7. Propyl Isocyanate | 7. $=C=N-CH_2CH_2CH_3$ |
| 8. Butyric Anhydride | 8. $-\overset{\overset{O}{\|}}{C}-CH_2CH_2CH_3$ |

TABLE 4
SIZE EXCLUSION AND HYDROPHOBIC (REVERSED PHASE)

$$\text{B.P. (I, II, III)-}R_3 \xrightarrow[\text{Dioxan}]{R_{11}} \text{B.P. (I, II, III)-}(R_3)-R_{12}$$

| $R_{11}$ | $R_{12}$ |
|---|---|
| 1. Adipic Acid Ester | 1. $-\overset{\overset{O}{\|}}{C}-(CH_2)_4-\overset{\overset{O}{\|}}{C}-$ |
| 2. Diethyl Malonate | 2. $-\overset{\overset{O}{\|}}{C}-CH_2-\overset{\overset{O}{\|}}{C}-$ |
| 3. Diethyl Succinate | 3. $-\overset{\overset{O}{\|}}{C}-CH_2-CH_2-\overset{\overset{O}{\|}}{C}-$ |
| 4. Ethyl Oxalate | 4. $-\overset{\overset{O}{\|}}{C}-\overset{\overset{O}{\|}}{C}-$ |
| 5. Ethyl Tartarate | 5. $(-CH(OH)\overset{\overset{O}{\|}}{C}-)_2$ |
| 6. Methyl Enathate | 6. $-\overset{\overset{O}{\|}}{C}-(CH_2)_5CH_3$ |
| 7. Methyl Stearate | 7. $-\overset{\overset{O}{\|}}{C}-(CH_2)_{16}CH_3$ |
| 8. Mucic Acid Ester | 8. $-\overset{\overset{O}{\|}}{C}-\overset{\overset{H}{\|}}{\underset{\underset{OH}{\|}}{C}}-\overset{\overset{OH}{\|}}{\underset{\underset{H}{\|}}{C}}-\overset{\overset{OH}{\|}}{\underset{\underset{H}{\|}}{C}}-\overset{\overset{H}{\|}}{\underset{\underset{OH}{\|}}{CH}}-\overset{\overset{O}{\|}}{C}-$ |
| 9. Sebacic Acid Ester | 9. $-\overset{\overset{O}{\|}}{C}-(CH_2)_8-\overset{\overset{O}{\|}}{C}-$ |
| 10. Methyl Isobutyrate | 10. $-\overset{\overset{O}{\|}}{C}-CH(CH_3)_2$ |
| 11. Methyl P—Nitro Benzoate | 11. $-\overset{\overset{O}{\|}}{C}-C_6H_5NO_2$ |

Figure 4:
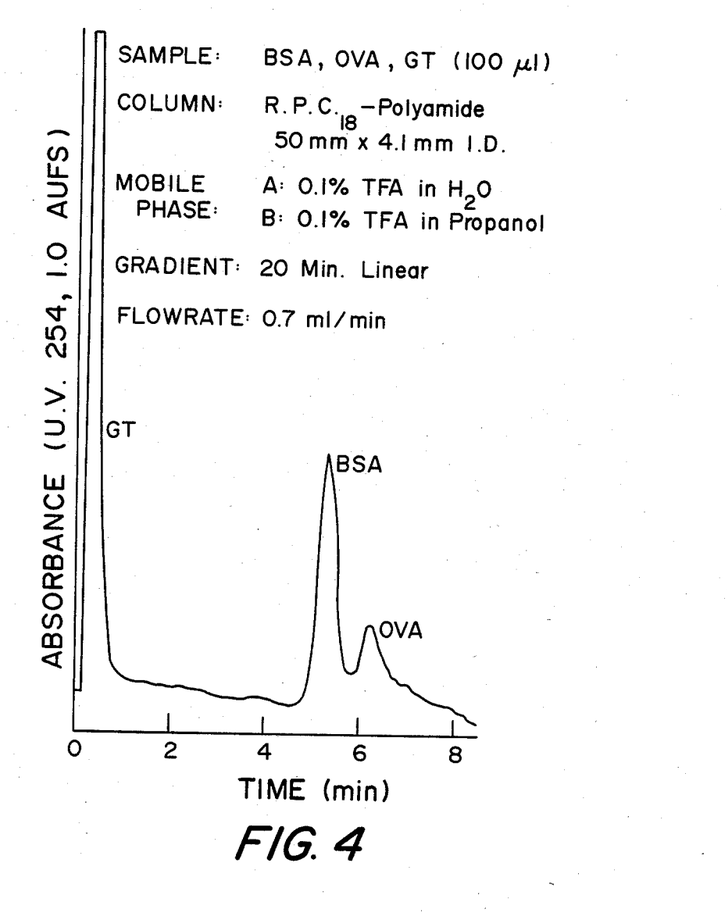
FIG. 4 is an elution curve for a $C_{18}$ reverse phase-polyamide column.
Figure 5:
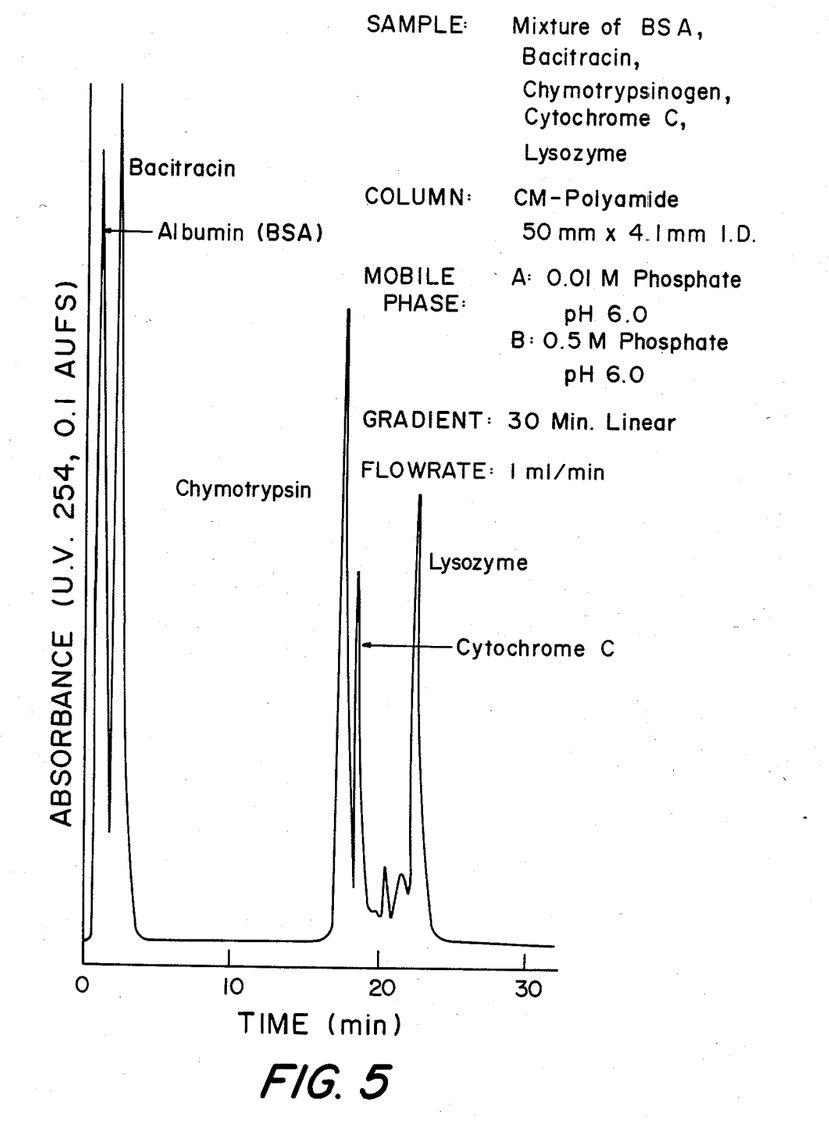
FIG. 5 is an elution curve for a carboxymethylpolyamide support column.

It has been noted above that as the ionic strength of the mobile-phase or alkyl chain length is increased the retention of proteins switches from a size exclusion to a hydrophobic mechanism. Exploitation of this effect in the resolution of proteins is shown in FIGS. 4 and 5.

The synthetic pathway for the preparation of both strong and weak cation exchange supports is shown in Table 5 as follows:

TABLE 5
CATION EXCHANGE $$\text{B.P. (I, II, III)-}R_3 \xrightarrow[\text{Dioxane; Pyridine}]{R_{13}} \text{B.P. (I, II, III)-}(R_3)-R_{14}$$

| $R_{13}$ | $R_{14}$ |
|---|---|

TABLE 5-continued
CATION EXCHANGE 1. 1,2,3,4-cyclopentanetetracarboxylic Dianhydride 2. Diglycolic Anhydride — $-\overset{O}{\underset{\|}{C}}-CH_2OCH_2CO_2H$ 3. Dioctylsulfosuccinate Sodium Salt — $-\overset{O}{\underset{\|}{C}}-\overset{SO_3H}{\underset{|}{CH}}-CH_2-\overset{O}{\underset{\|}{C}}-$ 4. Dodecene-1-YL—Succinic Anhydride — $-\overset{O}{\underset{\|}{C}}-\overset{CH_2CH=CH(CH_2)_8CH_3}{\underset{|}{CH}}CH_2CO_2H$ 5. Ethylene/Maleic Anhydride Copolymer — $(CH_2CH_2-\overset{CO_2H}{\underset{|}{CH}}-CH)$, $O=C-$ 6. Methylvinyl Ether/Maleic Anhydride Copolymer — $(CH_3CH=CH_2-\overset{CO_2H}{\underset{|}{CH}}-CH)$ 7. 1,3-Proanesultone/Acetic Anhydride — $-NCH_2CH_2CH_2SO_3H$, $O=C-CH_3$ 8. Succinic Anhydride — $-\overset{O}{\underset{\|}{C}}-CH_2CH_2CO_2H$ 9. Tetrahydrofuran-2,3,4,5-Tetra-Carboxylic Dianhydride Table 6 shows both the elemental analysis and the protein ion exchange capacity for these materials. Table 6 is as follows:

TABLE 6

| Ser. No. | $^1$S | $^2$B | $R_3$ | $R_8$ | $R_{10}$ | $R_{12}$ | $R_{14}$ | $R_{17}$ | $R_{19}$ | $R_{21}$ | Mode | $^3$P | $^4$H |
|---|---|---|---|---|---|---|---|---|---|---|---|---|---|
| 1 | A | I | PIE$_3$ | | | | | | | | AX | 362 | |
| 2 | A | I | PEI$_3$ | 3 | | | | | | | AX | 242 | |
| 3 | A | I | PEI$_6$ | | | | | | | | AX | 431 | |
| 4 | E | I | PEI$_6$ | | | | | | | | AX | 363 | |
| 5 | F | I | PEI$_6$ | | | | | | | | AX | 154 | |
| 6 | A | III | PEI$_6$ | | | | | | | | AX | 201 | |
| 7 | A | II | PEI$_6$ | | | | | | | | AX | 405 | |
| 8 | A | I | PEI$_6$ | 1 | | | | | | | AX | 431 | |
| 9 | A | I | PEI$_6$ | 2 | | | | | | | AX | 313 | |
| 10 | A | I | PEI$_6$ | 3 | | | | | | | AX | 383 | |
| 11 | A | I | PEI$_6$ | 7 | | | | | | | AX | 449 | |
| 12 | A | I | PEI$_6$ | 8 | | | | | | | AX | 449 | |
| 13 | A | I | PEI$_6$ | 9 | | | | | | | AX | 449 | |
| 14 | A | I | PEI$_6$ | 10 | | | | | | | AX | 414 | |
| 15 | C | I | PEI$_6$ | 11 | | | | | | | AX | 707 | |
| 16 | A | I | PEI$_6$ | 12 | | | | | | | AX | 489 | |
| 17 | A | I | PEI$_6$ | 13 | | | | | | | AX | 380 | |
| 18 | A | I | PEI$_6$ | 14 | | | | | | | AX | 449 | |
| 19 | A | I | PEI$_6$ | 15 | | | | | | | AX | 449 | |
| 20 | E | I | PEI$_6$ | 3 | | | | | | | AX | 201 | |
| 21 | A | I | PEI$_{12}$ | | | | | | | | AX | 854 | |
| 22 | A | I | PEI$_{12}$ | 3 | | | | | | | AX | 465 | |
| 23 | A | I | PEI$_{18}$ | | | | | | | | AX | 957 | |

TABLE 6-continued

| | | | | | | | | |
|---|---|---|---|---|---|---|---|---|
| 24 | A | I | PEI₁₈ | 3 | | | AX | 552 |
| 25 | B | I | PEI₆ | | 1 | | SEC | 90 |
| 26 | D | I | PEI₆ | | 1 | | SEC | 351 |
| 27 | F | I | PEI₆ | | 1 | | SEC | 60 |
| 28 | C | I | PEI₆ | | 1 | | SEC | 293 |
| 29 | F | I | PEI₆ | | | | AX | 154 |
| 30 | C | I | PEI₆ | 3 | | | AX | 759 |
| 31 | A | I | PEI₆ | | 6 | | RP | 169 |
| 32 | A | I | PEI₆ | | 7 | | RP | 169 |
| 33 | A | I | PEI₆ | | 10 | | RP | 260 |
| 34 | A | I | PEI₆ | 2 | | | RP | 79 |
| 35 | A | I | TEPA | | | | AX | 259 |
| 36 | B | I | TEPA | | | | AX | 242 |
| 37 | D | I | TEPA | | | | AX | 880 |
| 38 | A | III | PEI₆ | 13 | | | AX | 201 |
| 39 | A | III | PEI₆ | 3 | | | AX | 380 |
| 40 | A | II | PEI₆ | 3 | | | AX | 190 |
| 41 | A | I | PEI₆ | | | 2 | CHELA-TION | 293 |
| 42 | A | I | PEI₆ | | 1 | | —SH— | 126 |
| 43 | C | I | PEI₆ | | 1 | | —SH— | 414 |
| 44 | C | I | PEI₆ | | 1 | | DMAE AX | 776 |
| 45 | A | I | PEI₆ | 5 | | | RP | |
| 46 | C | I | PEI₆ | | 1 | | CX | 39 |
| 47 | C | I | PEI₆ | | 2 | | CX | 18 |
| 48 | C | I | PEI₆ | | 3 | | CX | 27 |
| 49 | C | I | PEI₆ | | 8 | | CX | 30 |
| 50 | C | I | PEI₆ | | 9 | | CX | 36 |
| 51 | G | I | PEI₆ | | 2 | | CX | 45 |
| 52 | G | I | PEI₆ | | 8 | | CX | 60 |
| 53 | A | I | PEI₆ | | 8 | | CX | 38 |
| 54 | A | I | TEPA | | 8 | | CX | 51 |
| 55 | G | I | TEPA | | 2 | | CX | 68 |
| 56 | A | I | PIE₆ | | 2 | | CX | 103 |
| 57 | A | I | PEI₆ | | 7 | | CX | 88 |
| 58 | A | I | PEI₆ | | | 1 | CHELA-TION | |

| SERIAL NO. | SILICA | PARTICLE SIZE (u) | PORE DIAMETER (A°) | SURFACE AREA m²/9 |
|---|---|---|---|---|
| A | VYDAC | 5 | 300 | 100 |
| B | VYDAC | 10 | 300 | 100 |
| C | LICHROSORB | 10 | 100 | 300 |
| D | LICHROSPHERE | 10 | 100 | 370 |
| E | LICHROSPHERE | 5 | 1000 | |
| F | LICHROSPHERE | 10 | 4000 | |
| G | LICHROSPHERE | 10 | 500 | |

[1] S Support Type
[2] B Bonded Phase Type from reaction diagrams
[3] P Picric Acid in pairing capacity (IPC) in mol/gm
[4] H Hemoglobin ion exchange capacity in mg/g
AX Anion Exchange
SEC Size-exclusion
RP Reversed Phase
CX Cation Exchange
DMAE Dimethylaminoethyl anion exchange Application of the carboxymethyl (CM) support in the resolution of a series of basic proteins is shown in FIG. 5. Gradient elution with a starting buffer of 0.02 molar phosphate (pH 6.5) to a final buffer of 0.5 molar phosphate (pH 6.5) achieved resolution of the protein mixture in 20 minutes. Both the elution conditions and the separation obtained are similar to those achieved on the classical carboxymethyl cellulose support. Columns 5 centimeters in length gave resolution almost equivalent to 30 centimeter columns as has been noted in the case of anion exchange supports. Gradient elution of trypsin and chymotrypsin showed that greater than 90 percent of the activity of these enzymes could be recovered from the weak cation exchange columns.

Primary amine supports have long been used in affinity chromatography for the immobilization of both proteins and simple ligands. Use of the covalently bonded PEI supports and gluteraldehyde in the immobilization of the enzyme urease is shown in Table 7 as follows:

TABLE 7

AFFINITY $$\text{B.P. (I, II, III)-R}_3 \xrightarrow{R_{15}} \text{B.P. (I, II, III)-(R}_3\text{)}-R_{15}$$

| $R_{15}$ | Linking Agents |
|---|---|
| 1. Acridine | 1. Butane Diol Diglycidyl Ether |
| 2. Acriflavine | 2. Glutaraldehyde |
| 3. Cibacrone Blue | 3. 1,6-Diisocyanate Hexane |
| 4. Conconavalin | 4. Dimethyl Suberimidate Hydrochloride |
| 5. Lactase | 5. 1-Ethyl-3-(3-Dimethylaminopropyl) Carbondiimide |
| 6. NAD | |
| 7. Urease | |

Immobilization occurs in shiff base formation between primary amines in the support and primary amines in the protein. Further stabilization of the bonded ligand may be achieved by sodium borohydride reduction of the shiff base. This would be recommended in the immobilization of low molecular weight primary amines. Additional routes of immobilization through amides, esters, oxiranes and disulfides are described in Table 7. On the basis of studies with PEI supports, it is felt that these materials will be similar to those earlier described on controlled porosity glass.

Chelation supports used in these studies were prepared as shown in Table 8 as follows:

TABLE 8

DIMETHYLAMINOETHYL SUPPORT
(STRONG ANION EXCHANGE)

A. B.P. (I, II, III)-$R_3$ $\xrightarrow[\text{NaOH}]{R_{16}}$ B.P. (I, II, III)-$R_3R_{17}$ $R_{16}$      $R_{17}$
1. Methyl Iodide      1. $CH_3$

SULFHYDRYL SUPPORT

B. B.P. (I, II, III)-$R_3$ $\xrightarrow{R_{18}}$ B.P. (I, II, III)-$R_3$—$R_{19}$ $R_{18}$      $R_{19}$ 1. N—Acetyl Homocyteine-Thiolactone      1. $-\overset{O}{\underset{\|}{C}}-\overset{NHCO_2CH_3}{\underset{|}{CH}}CH_2CH_2SH$

CHELATION

C. B.P. (I, II, III)-$R_3$ $\xrightarrow{R_{20}}$ B.P. (I, II, III)-$R_3$—$R_{21}$ $R_{20}$      $R_{21}$
1. Iodoacetic Acid      1. $(-CH_2CO_2H)_2$ 2. Pyridine-2-Carboxylaldehyde      2. $=\overset{H}{\underset{|}{C}}-C_6H_5N$ Behavior of these materials was similar to that of Celex 100 with the binding of multivalent cations at neutral pH and their release at acidic pH. The principal use of these support materials in protein chromatography is felt to be to incorporate small columns of the chelator in the solvent delivery lines between the pump and the sample inlet valve. The function of these columns would then be to remove heavy metals from the mobile-phase that were either present in the buffers or derived from the metal in the pumping system. New supports would both function as a mobile-phase silica saturator and to remove heavy metals.

The following examples illustrate the invention:

EXAMPLE 1: Preparation of 2-Carbethoxyethyl Silica (B.P. TYPE 1)

Twenty grams of 100 Å pore diameter porous silica (Lichrosorb, particle size, 10 μm) were treated at room temperature for 45 minutes with a solution containing 200 ml of carbon tetrachloride and 8 ml of 2-carbethoxyethyltrichlorosilane. After mixing the mixture was sonicated for five min and degassed. The suspension was then filtered and washed successively with 50 ml of $CCl_4$, 50 ml of acetone; 100 ml of water and finally with 50 ml of acetone.

EXAMPLE 2: Preparation of Oxirane Bonded Silica (B.P. TYPE II)

Ten grams of 100 ° pore diameter porous silica Lichrosorb (particle size 10 μm) were treated at 90° C. for 12 hr with a solution containing 100 ml of toluene and 10 ml of γ-glycidoxypropyl dimethylmethoxysilane. The suspension was then filtered and washed with 50 ml of toluene and 60 ml of acetone.

EXAMPLE 3: Preparation of Isocyanate Bonded Silica (B.P. TYPE III)

Ten grams of 100 Å pore diameter porous silica, Lichrosorb (particle size 10 μm) were treated with a solution containing 200 ml of carbon tetrachloride and 8 ml of isocyanatoethyldimethylchlorosilane, at room temperature for 45 min. The suspension was then filtered and washed successively with 50 ml of $CCl_4$, 50 ml of acetone; 100 ml of water and 50 ml of acetone.

EXAMPLE 4: Preparation of Polyamine Bonded Silica Derivatized with Neutral Organosilane Five grams of neutral organosilane bonded silica, Lichrosorb (from any of examples 1, 2 and 3) were treated at room temperature for 12 hr with a solution of 100 ml of dioxane, 5 ml methoxyethanol and 4 grams of polyamine (polyethyleneamine, polyvinylamine, tetraethylenepentamine, agamatine). The suspension was then heated at 80° C. for 45 minutes after which the suspension was filtered, washed with 50 ml of methanol; 100 ml of water and finally with 50 ml of acetone.

EXAMPLE 5: Preparation of Mono, Di-Oxirane/Polyamine Bonded Phase

Two grams of polyamine bonded Lichrosorb (10 μm) were suspended in a solution containing 4% of either a mono- or bifunctional oxirane (Table 1) in 30 ml dioxane. After keeping the suspension overnight at room temperature, it was heated at 90° C. for 30 min. Following filtration, the material was washed with ethanol and acetone.

EXAMPLE 6: Preparation of Size-Exclusion Support Using Monoanhydride/Polyamine Bonded Silica Three grams of polyamine bonded Lichrosorb (10 μm) were suspended at room temperature overnight with a solution containing 4% acetic or some other anhydride (Table 3) in dioxane and 4 ml of pyridine. The suspension was then heated at 90° C. for 45 min. The product thus obtained was filtered, washed with ethanol, water and acetone.

EXAMPLE 7: Preparation of Hydrophobic (Reversed Phase) Support Using Polyamine Bonded Silica Three grams of polyamine bonded Lichsorb (5 μm) were heated at 120° C. with a 10% carboxylic acid ester (esters of $C_4$, $C_6$, $C_8$, $C_{12}$, $C_{18}$) in dioxane for 12 hr. (as shown in Table 4). The suspension was filtered and washed sequentially with methanol and acetone.

EXAMPLE 8: Preparation of Cation Exchange Using Dianhydride/Polyamine Bonded Lichrosorb Two grams of polyamine bonded Lichrosorb (10 μm) were suspended at room temperature overnight with a solution containing 4% diglycolic anhydride or any dianhydride as shown in Table 5 in dioxane and 4 ml of pyridine. The suspension was then heated at 90° C. for 45 min. The product thus obtained was filtered and washed with ethanol, water and acetone.

EXAMPLE 9: Preparation of Sulphonated Support (Strong Cation Exchanger).

One gram of support was suspended in $H_2O$ (40 ml). 1,3-Propane sultone (4 g) in dioxane (15 ml) was added drop by drop to the above solution. The pH of solution was maintained at 7.5 with 1N NaOH during the reaction. The stirring was allowed to continue for an hour more after no further addition of 1N NaOH was required. The product was then filtered and washed with water and acetone. The sulphonated material was then suspended in a solution of pyridine (70 ml), $H_2O$ (20 ml) and acetic anhydride (20 ml). The mixture was allowed to stand over night. The next morning the mixture was heated on a water bath for half an hour. The product thus obtained was filtered, washed with $H_2O$ and acetone.

EXAMPLE 10: Preparation of Acridine or Acriflavine Bonded Supports With the Use of Polyamine Bonded Silica One gram of polyamine bonded Vydac 300(5 μm) was suspended at room temperature in a solution containing 650 ml of either glutaraldehyde, suberimadate hydrochloride, hexane 1,6-diisocyanate hexane or butane dioldiglycidylether and allowed to react for two hours. Following filtration, the material was washed thoroughly with water. The activated silica was resuspended at room temperature in a solution containing 800 mg of either acridine or acriflavine in a solution containing 20 ml of dioxan (hydrochloride free) and 1 ml of $H_2O$ and the mixture was allowed to stand overnight. After a final heating at 65°-70° C. for 30 min. the product was filtered, washed sequentially with methanol, $H_2O$ and finally with acetone.

EXAMPLE 11: Preparation of Cibacron Blue Reactive Support Using Polyamine Bonded Silica One gram of polyamine bonded Lichrosorb (5 μm) was suspended and kept at room temperature over night with a solution containing 600 mg of cibacron blue and 650 mg of either glutaraldehyde, hexane 1,6-dicyanate or butanediol-diglycidylether, or dimethyl suberimidate (hydrochloride) in 20 ml of dioxane. The suspension was then heated at 65°-70° C. for 30-40 min. after which it was filtered and washed sequentially with methanol, water and acetone.

EXAMPLE 12: Preparation of NAD Support Using Polyamine Bonded Silica

One gram of polyamine bonded Lichrosphere (5 μm) was suspended at room temperature and kept overnight with a solution containing 500 mg of NAD and 500 mg of either glutaraldehyde, hexane 1,6-dicyanate, butanedioldiglycidylether or dimethyl suberimidate (hydrochloride) in 20 ml of dioxane. The suspension was then heated at 65°-70° C. for 30-40 min. Following filtration, the material was washed with methanol, water and acetone.

EXAMPLE 13: Preparation of the Immobilized Enzyme Supports Using Polyamine Bonded Silica One gram of polyamine bonded Lichrosorb (10 μm) was suspended at room temperature for two hours in a solution containing 650 ml of either glutaraldehyde or hexane 1,6-disocyanate. Following filtration, the material was washed thoroughly with water. The packing was resuspended at room temperature in a solution containing 850 mg of urease or lactase in water. The protein immobilization rate was assayed colorimetrically. After the reaction, the mixture was filtered and washed with cold water.

EXAMPLE 14: Preparation of Dimethylaminoethyliodide Supports

One gram of support was added to a solution of methyliodide (4 g) in a mixture of dioxane (15 ml) and $H_2O$ (35 ml). pH of solution was maintained at 7.5 with 1N NaOH. Stirring was continued for an hour more after no further addition of NaOH was required. The filtered product was washed with $H_2O$ and acetone.

EXAMPLE 15: Preparation of Sulphydryl Support

Two gram of support was added to a solution of N-acetylhomocysteine thiolactone (1.5 g) in $H_2O$ (100 ml) with stirring at room temperature. pH was maintained at 7.5 during the reaction. The suspension was allowed to stand at room temperature for four hours after which it was filtered and washed sequentially with water containing 50 g. of thiourea and 1N $HNO_3$ (70 ml). Finally the sulphydryl support was washed with thiourea (20 g) in 1N $HNO_3$ (100 ml) and then with $H_2O$ and acetone.

EXAMPLE 16: Preparation of Iminodiacetic Acid Support For Chelation

This support was prepared by two different routes, as shown in Table 8(C).

A. A gram of support was suspended in water (40 ml). Iodoacetic acid (2 g) in $H_2O$ (10 ml) was added drop by drop, and pH of the solution maintained at 7.5. After the addition, the mixture was allowed to react for another 2.5 hours. The pH of mixture was adjusted to 6.5, filtered, and washed sequentially with water and acetone.

B. A gram of support was suspended in a solution containing pyridine (50 ml) and iodoacetic acid (2 g) in $H_2O$ (10 ml). The mixture was allowed to stand at room temperature overnight after which it was heated at 90° C. for 40 min. The reaction mixture was filtered and the silica washed sequentially with acetone, water and finally again with acetone.

EXAMPLE 17: Preparation of Schiff's Base of Polyamine Bonded Silica with Pyridine-2-Carboxaldehyde To a solution containing pyridine-2-carboxaldehyde (800 mg) in dioxane (20 ml), polyamine bonded Vydac 300(5 μm) (1.0 g) was added. The mixture was allowed to stand overnight after which it was filtered and washed sequentially with acetone, $H_2O$ and finally with acetone. This support can be used for the chelation of metals.

As can be appreciated from the foregoing, this invention provides improved supports that are particularly useful for selective partitioning in a chromatographic system, and an improved process for forming the supports.

What is claimed is:

1. A process for producing a bonded support for a chromatographic system, said process comprising:
   providing a support structure having an inorganic surface;
   providing a preformed polyamine;
   bonding a neutral organosilane to said inorganic surface with said neutral organosilane having a functional group sufficiently reactive so that said preformed polyamine reacts with said functional group to cause covalent bonding of said preformed polyamine through said functional group to said inorganic surface to form a stable inorganic polyamine matrix; and attaching a ligand to said support matrix.

2. The process of claim 1 wherein said process provides a bonded support for selective partitioning of molecules ranging from about 16 to $10^7$ daltons.

3. The process of claim 1 wherein said support structure is provided by inorganic materials having a pore diameter of between about 100 to 1000 Å.

4. The process of claim 1 wherein said support structure is provided by inorganic materials of between about 5 to 100 micrometers in particle size.

5. The process of claim 1 wherein said neutral organosilane provides a thin neutral organic layer on said inorganic surface that eliminates the maximum number of surface silanoles and serves as anchoring means for attachment of said polyamine.

6. The process of claim 1 wherein said neutral organosilane is one of 2-carbethoxyethyltrichlorosilane, γ-glycidoxypropyl dimethylmethoxysilane and isocyanethyl dimethylchlorosilane.

7. The process of claim 1 wherein said neutral organosilane is one of a trichlorosilane, a dichlorosilane, and a monochlorosilane.

8. The process of claim 1 wherein said polyamine is covalently cross-linked to said inorganic surface having said neutral organosilane bonded thereto.

9. The process of claim 8 wherein said polyamine is one of polyethyleneamine, polyvinylamine, tetraethylenepentamine, or agamatine.

10. The process of claim 1 wherein said ligand is covalently cross-linked through said support matrix.

11. The process of claim 10 wherein said ligand is covalently cross-linked through said support matrix to form one of an anion exchange support, a cation exchange support, a size exclusion support, a reverse phase hydrophobic support, an affinity support, and a chelation support.

12. A process for producing a support matrix for a chromatographic system, said process comprising:

providing a support structure having an inorganic surface;

providing a preformed organic amine polymer; and bonding a neutral organosilane to said inorganic surface with said neutral organosilane having a functional group sufficiently reactive so that said organic amine polymer reacts with said functional group to cause covalent bonding of said organic amine polymer through said functional group to said inorganic surface to form a stable organic polyamine matrix convertible into a plurality of types of chromatographic supports.

13. The process of claim 12 wherein said process provides a support matrix for one of an anion exchange support, a cation exchange support, a size exclusion support, a reverse phase hydrophobic support, an affinity support, and a chelation support.

14. The process of claim 12 wherein said organic amine polymer is covalently bonded in a thin layer on said inorganic surface.

15. The process of claim 12 wherein said functional group is an organic functional group including one of esters, isocyanates and epoxides.

16. A process for producing a bonded support for a chromatographic system, said process comprising:

providing a support structure having an inorganic surface;

providing a preformed organic amine polymer;

bonding a neutral organosilane to said inorganic surface with said neutral organosilane having a functional group sufficiently reactive so that said organic amine polymer reacts with said functional group to cause covalent bonding of said organic amine polymer through said functional group to said inorganic surface to form a stable organic polyamine matrix; and attaching an organic stationary phase group to said organic polyamine matrix.

17. The process of claim 16 wherein said organic amine polymer is covalently bonded in a thin layer on said inorganic surface.

18. The process of claim 16 wherein said functional group is an organic functional group including one of esters, isocyanates and epoxides.

19. The process of claim 16 wherein said organic stationary phase is made by derivating polyamine with an oxirane to form an anion exchange support.

20. The process of claim 19 wherein said derivating of polyamine is carried out by one of butane monoepoxide, butane diepoxide, butane diol diglycidylether, Epon 812, Epon 828, 1,2-epoxy-ethoxy propane, 1,2-epoxy-3-pentoxy propane, 1,2-epoxy-3-propoxy propane, 1,2-epoxy-3-hexoxy propane, ethane diol diglycidyl ether, ethylene oxide, glycidol, or propylene oxide.

21. The process of claim 16 wherein said organic stationary phase is made by treating said organic polyamine matrix with cyclic anhydride or 1,3-propane sultone to form a cation exchange support.

22. The process of claim 21 wherein said organic polyamine matrix is treated with one of 1,2,3,4-cyclopentanetetracarboxylic dianhydride, diglycolic anhydride, dioctylsulfosuccinate sodium salt, dodecene-1-YL-succinic anhydride, ethylene/maleic anhydride copolymer, methylvinyl ether/maleic anhydride copolymer, 1,3-proanesultone/acetic anhydride, succinic anhydride, tetrahydrofuran-2,3,4,5-tetra-carboxylic dianhydride.

23. The process of claim 16 wherein said inorganic stationary phase is made by treating said organic polyamine matrix with acetic anhydride to form a polyamine acetate coating to form a size exclusion support.

24. The process of claim 16 wherein said organic stationary phase is made by treating said organic polyamine matrix with the esters or anhydrides or higher carbon chain links to form a reversed phase hydrophobic support.

25. The process of claim 16 wherein said organic polyamine matrix is treated with one of acetic anhydride, benzoic anhydride, hexanoic anhydride, propionic anhydride, trifluoroacetic anhydride, methyl isocyanate, propyl isocyanate, butyric anhydride to form a size exclusion reversed phase hydrophobic support.

26. The process of claim 16 wherein said organic stationary phase is made by treating said organic polyamine matrix to produce a primary amine support to form an affinity support.

27. The process of claim 16 wherein said organic stationary phase is made by treating said organic polyamine matrix with one of acridine, acriflavine, cibacrone blue, conconavalin, lactase, NAD, urease using one of butane diol diglycidyl ether, glutaraldehyde, 1,6-diisocyanate hexane, dimethyl suberimidate hydrochloride, 1-ethyl-3-(3-dimethylaminopropyl) carbodiimide as a linking agent to form an affinity support.

28. The process of claim 16 wherein said organic stationary phase is made by treating said organic polyamine matrix with one of iodocetic acid and pyridine-2-carboxylaldehyde to form a chelation support.

29. The process of claim 16 wherein said organic polyamine matrix is treated with methyl iodide to form a dimethylaminoethyl support.

30. The process of claim 16 wherein said organic polyamine matrix is treated with N-acetyl homocyteinethiolactone to form a sulfhydryl support.

31. A process for producing a bonded support for a chromatographic system, said process comprising:

providing a support structure having an inorganic surface;

bonding a neutral organosilane to said inorganic surface, said neutral organosilane having a functional group including one of esters, isocyanates and epoxides;

covalently bonding a preformed organic amine polymer to said organic surface to form a stable polyamine matrix, said polymer being one of polyethyleneamine, polyvinylamine, tetraethylenepentamine, and agamatine with said polymer reacting with said functional group of said neutral organosilane to cause said covalent bonding of said polymer through said functional group to said inorganic surface; and covalently bonding an organic stationary phase to said polyamine matrix to form a predetermined type of chromatographic support.

32. A bonded support for a chromatographic system made by the process as set forth in claim 1.

33. A bonded support matrix for a chromatographic system made by the process as set forth in claim 12.

* * * * *